(12) United States Patent
Kamosawa et al.

(10) Patent No.: US 6,778,249 B1
(45) Date of Patent: Aug. 17, 2004

(54) LIQUID-CRYSTAL DISPLAY ELEMENT AND METHOD FOR MANUFACTURING SAME

(75) Inventors: Hirofumi Kamosawa, Tokyo (JP); Takeya Shimizu, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 302 days.

(21) Appl. No.: 09/621,460

(22) Filed: Jul. 21, 2000

(30) Foreign Application Priority Data

Jul. 23, 1999 (JP) .......................................... 11-208450

(51) Int. Cl.⁷ .......................................... G02F 1/1339
(52) U.S. Cl. ..................................... 349/153; 349/187
(58) Field of Search ................................ 349/153, 154, 349/155, 187

(56) References Cited

U.S. PATENT DOCUMENTS

| | | | |
|---|---|---|---|
| 4,278,327 A | * 7/1981 | McMahon et al. | 349/197 |
| 5,268,782 A | * 12/1993 | Wenz et al. | 349/156 |
| 5,537,235 A | * 7/1996 | Ishihara et al. | 349/155 |
| 5,919,606 A | * 7/1999 | Kazlas et al. | 430/321 |
| 6,219,127 B1 | * 4/2001 | Hirakata et al. | 349/153 |

FOREIGN PATENT DOCUMENTS

| | | |
|---|---|---|
| JP | 58-140721 | 8/1983 |
| JP | 5-61011 | 3/1993 |
| JP | 5-188387 | 7/1993 |
| JP | 5-203924 A | 8/1993 |
| JP | 6-273737 A | 9/1994 |
| JP | 8-211377 A | 8/1996 |
| JP | 9-138417 A | 5/1997 |
| JP | 2678325 | 8/1997 |
| JP | 2678326 | 8/1997 |
| JP | 2722798 | 11/1997 |
| JP | 10-172423 A | 6/1998 |

\* cited by examiner

*Primary Examiner*—Dung T. Nguyen
*Assistant Examiner*—P. R. Akkapeddi
(74) *Attorney, Agent, or Firm*—Foley & Lardner LLP (57) ABSTRACT

In a liquid-crystal display element each individual liquid-crystal injection area surrounded by a seal, and the overall liquid-crystal injection area is surrounded by an array substrate and an opposing substrate surrounded by an outer peripheral seal having an aperture and are adhered together, the aperture of the outer peripheral seal being sealed by a hole sealant, and the surface of at least one of the array substrate and the opposing substrate being polished with a polishing material, which is then removed, after which cutting along the aperture is done to separate the individual liquid-crystal injection areas, thereby facilitating the achievement of a thin liquid-crystal display element, while improving the quality and yield thereof.

4 Claims, 7 Drawing Sheets

LIQUID-CRYSTAL DISPLAY ELEMENT AND METHOD FOR MANUFACTURING SAME

THE INVENTION

1. Field of the Invention

The present invention relates to a liquid-crystal display element suitable for a thin display having a pair of thin glass substrates, and to a method for manufacturing such a liquid-crystal display element.

2. Description about the Related Art

In liquid-crystal display elements used in displays for notebook personal computers and portable information terminals, in order to achieve a thin and light design, one essential element is to make the thickness of the pair of glass substrates of the liquid-crystal display element thin.

Figure 6:
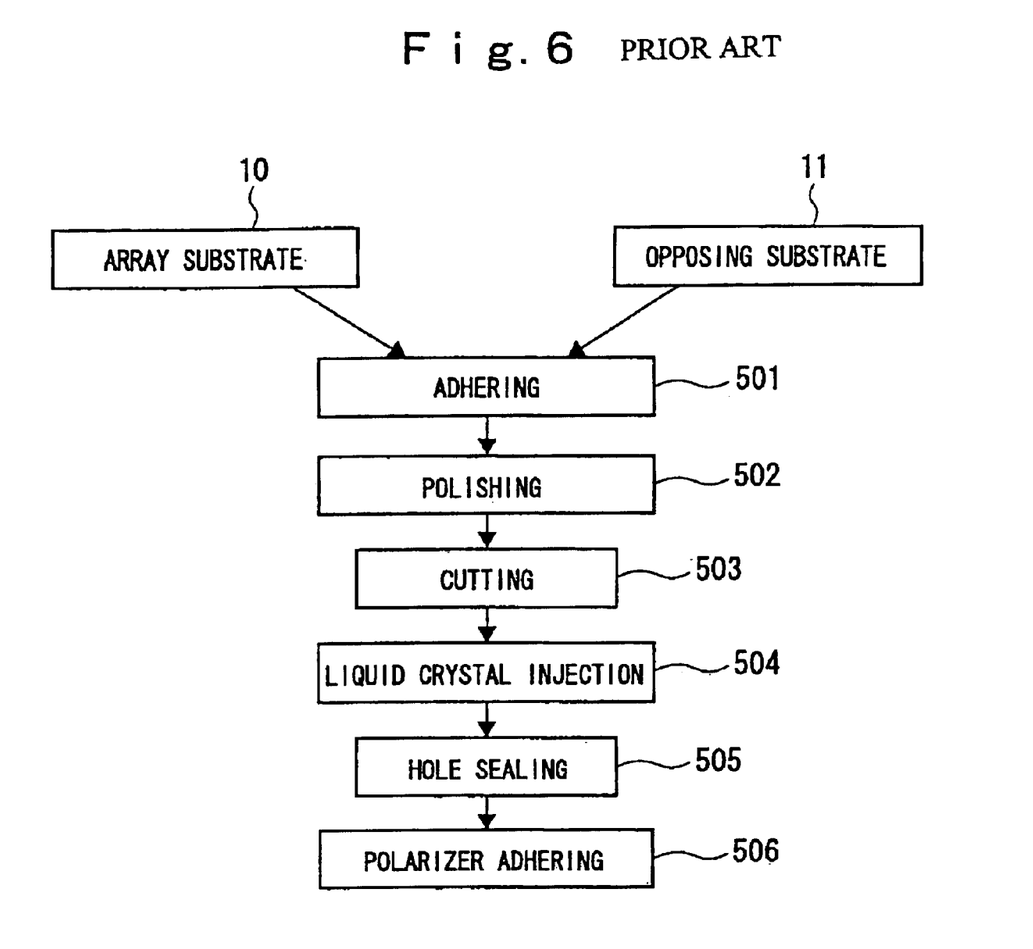
FIG. 6 is a process diagram showing the manufacturing process for a liquid-crystal display element of the past.

In order to make the thickness of the pair of glass substrates thin, as disclosed, for example, in the Japanese Unexamined Patent Publication (KOKAI) No. 5-61011, a liquid-crystal display element is formed by the process illustrated in FIG. 6.

Specifically, after affixing together an array substrate 10 and an opposing substrate 11, which are the pair of glass substrates, at least one of the array substrate 10 and the opposing substrate 11 is polished (steps 501 and 502). Next, after cutting the array substrate 10 and the opposing substrate 11, a liquid crystal is injected between the array substrate 10 and the opposing substrate 11. The resulting structure is sealed, and a polarizer is affixed thereto (steps 503 to 506).

The grain diameter used as a polishing material for polishing at least one of the array substrate 10 and the opposing substrate 11 is approximately 1 to 2 µm.

For this reason, the polishing material is intruded into the space (5 to 6 µm) between the array substrate 10 and the opposing substrate 11, thereby causing failures due to this foreign matter, which lowers the display quality and yield of the liquid-crystal display elements.

Figure 7:
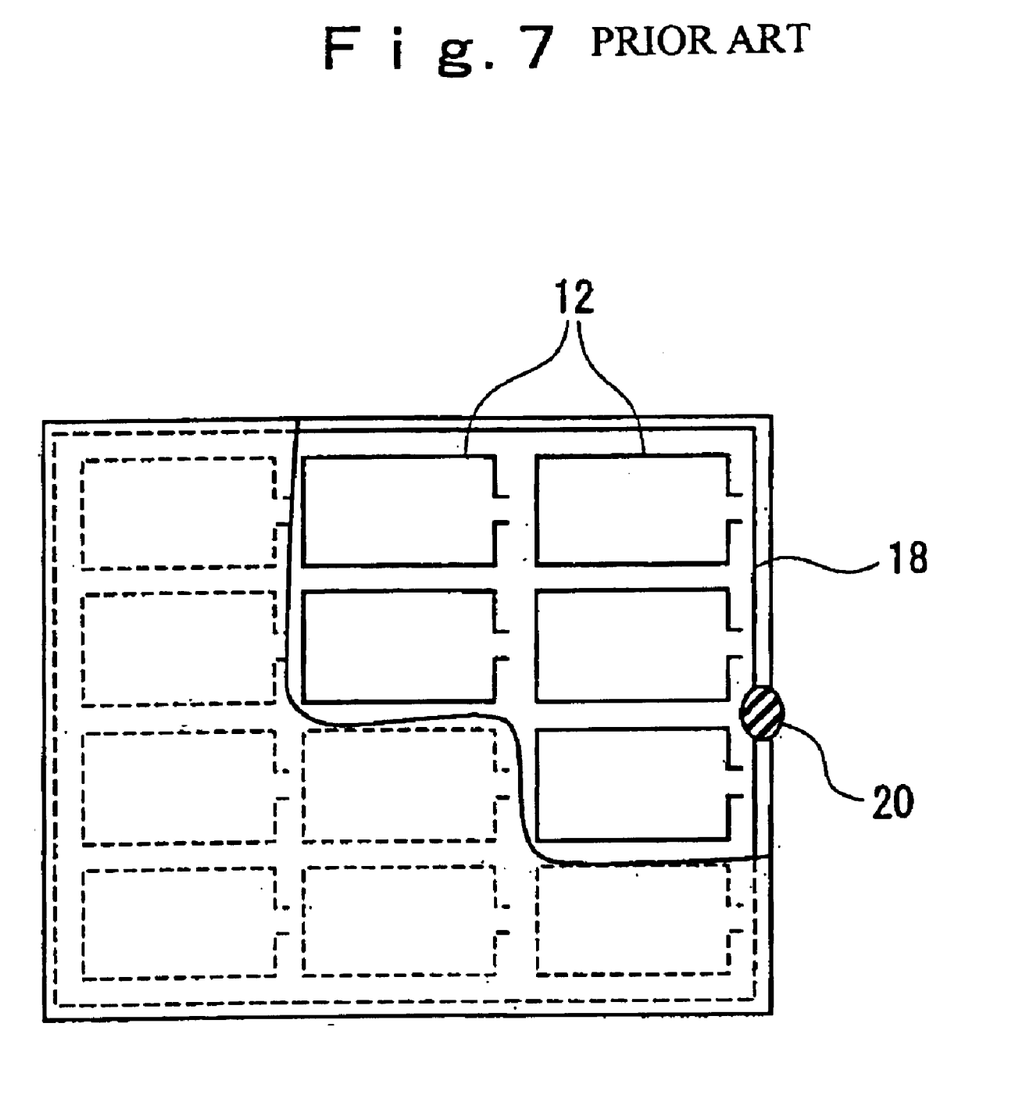
FIG. 7 is a plan view with a partial cutaway of a liquid-crystal display element manufacturing by the manufacturing method of FIG. 6.

Given the above, in order to solve the above-noted problem, in the Japanese Unexamined Patent Publications (KOKAI) Nos. 5-249422, 5-249423, and 4-116619, for example, the is disclosure of technology wherein, as shown in FIG. 7, when adhering together the array substrate and the opposing substrate, the liquid crystal injection region of the liquid-crystal display element area is surrounded by a seal 12, and further wherein the entire liquid-crystal display element area is surrounded by an outer peripheral seal 18, after which the hole is sealed by a hole sealant 20.

In this type of technology, because the overall liquid-crystal display element area is surrounded by an outer peripheral seal 18, in the above-noted case of performing polishing, intrusion of foreign matter into the space (5 to 60 µm) between the array substrate 10 and the opposing substrate 11 is prevented.

In the above-noted technology, however, in a method of surrounding the overall liquid-crystal display element area with the outer peripheral seal 18, when cutting apart the individual liquid-crystal display elements the outer peripheral shield 18 is also cut.

For this reason, because the stress on the pair of glass substrates is different between a part at which the outer peripheral seal 18 is cut and a part at which the outer peripheral seal 18 is not cut, improper cutting results when scribing and breaking the substrates.

When the above-noted types of problems occur, polishing material intrudes between the space between the outer peripheral seal 18 and the pair of glass substrates, thereby contaminating the manufacturing apparatus.

If the manufacturing apparatus becomes contaminated in this manner, polishing material can intrude into the liquid-crystal display element when the liquid crystal is injected, leading to improper liquid crystal orientation and faulty operation, such as the proper voltage not being applied across the liquid crystal, thereby causing a display failure and a drop in yield.

Accordingly, it is an object of the present invention, in consideration of the above-noted problems, to provide a liquid-crystal display element and a method for manufacturing a liquid-crystal display element wherein the achievement of thinness is facilitated and it is possible to achieve an improvement in yield and quality.

SUMMARY OF THE INVENTION

In order to achieve the above-noted object, the present invention has the following basic technical constitution.

Specifically, in a liquid-crystal display element according to one aspect of the present invention, an array substrate on which a plurality of liquid-crystal injection areas are arranged and each liquid-crystal injection area is surrounded by a seal having an aperture and the overall liquid-crystal injection areas being surrounded by an outer peripheral seal having an aperture, and an opposing substrate are adhered together, the aperture of the outer peripheral seal being sealed by a hole sealant, and a surface of at least one of the array substrate and the opposing substrate being polished with a polishing material, and thereafter, an end portion of at least either one of the array substrate and the opposing substrate being polished with end polishing operation so as to remove residual polishing material therefrom, after which cutting plurality of liquid-crystal injection areas along lines as formed between the opposite the aperture holes so as to separate individual liquid crystal injection areas.

In this aspect of the present invention, a plurality of the apertures of the outer peripheral seal are provided along the outer peripheral seal and at crossing points each being formed between the outer peripheral seal and a line along which the individual liquid-crystal injection areas are cut apart.

In this aspect of the present invention, it is possible to inject liquid crystal into each individual injection area, seal the areas, and adhere polarizers after the individual liquid crystal injection areas are separated.

The seal and outer peripheral seals can be made of an epoxy resin, the hole sealant can be a UV-curing acrylic resin, and the polishing material can be an alumina polishing material.

A method for manufacturing a liquid-crystal display element according to another aspect of the present invention comprising, a first step of forming a plurality of liquid-crystal injection areas surrounded with a seal on an array substrate, a second step of adhering the array substrate on which overall the liquid-crystal injection areas being surrounded by an outer peripheral seal having an aperture and an opposing substrate, a third step of sealing the aperture of the outer peripheral seal using a hole sealant, a fourth step of polishing a surface of at least one of the array substrate and the opposing substrate using a polishing material, a fifth step of polishing an end surface of at least one of the array substrate and the opposing substrate, using a polishing material and removing the polishing material, and a sixth step of cutting the liquid-crystal injection areas along a virtual lines each formed between the apertures each provided on two of the outer peripheral seals, respectively, and each of the outer peripheral seals being oppositely arranged to each other.

The second step thereabout can include a seventh step of providing a plurality of the apertures being provided along each one of the outer peripheral seals and at crossing points each being formed between the outer peripheral seal and a virtual line along which the individual liquid-crystal injection areas would thereafter be cut apart.

The sixth step can include an eighth step of injecting liquid crystal into each liquid-crystal injection area, sealing the hole, and adhering a polarizer.

The first step can include a ninth step of forming a seal using an epoxy resin, the second step can include a tenth step of forming an outer peripheral seal using an epoxy resin, and the third step can include an eleventh step of forming a hole sealant with a UV-curing acrylic resin.

The fourth step can include a twelfth step of performing polishing using an alumina polishing material, a thirteenth step of performing lapping, and a fourteenth step of performing final polishing, and the fifth step can include a fifteenth step of chamfering the polished end surface.

In a liquid-crystal display element and a method for manufacturing a liquid-crystal display element according to the present invention, an array substrate on which a plurality of liquid-crystal injection areas surrounded with a seal and the overall liquid-crystal injection areas being surrounded by an outer peripheral seal are provided and an opposing substrate are adhered together, the aperture of the outer peripheral seal being sealed by a hole sealant, and the surface of at least one of a surface of the array substrate and the opposing substrate being polished with a polishing material and further an end portion thereof is also polished so that the polishing material is removed, after which cutting along the aperture is done to separate the individual liquid-crystal injection areas.

DETAILED DESCRIPTION OF THE PREFERRED EMBODIMENTS

Embodiments of the present invention are described in detail below, with references made to relevant accompanying drawings.

Figure 1:
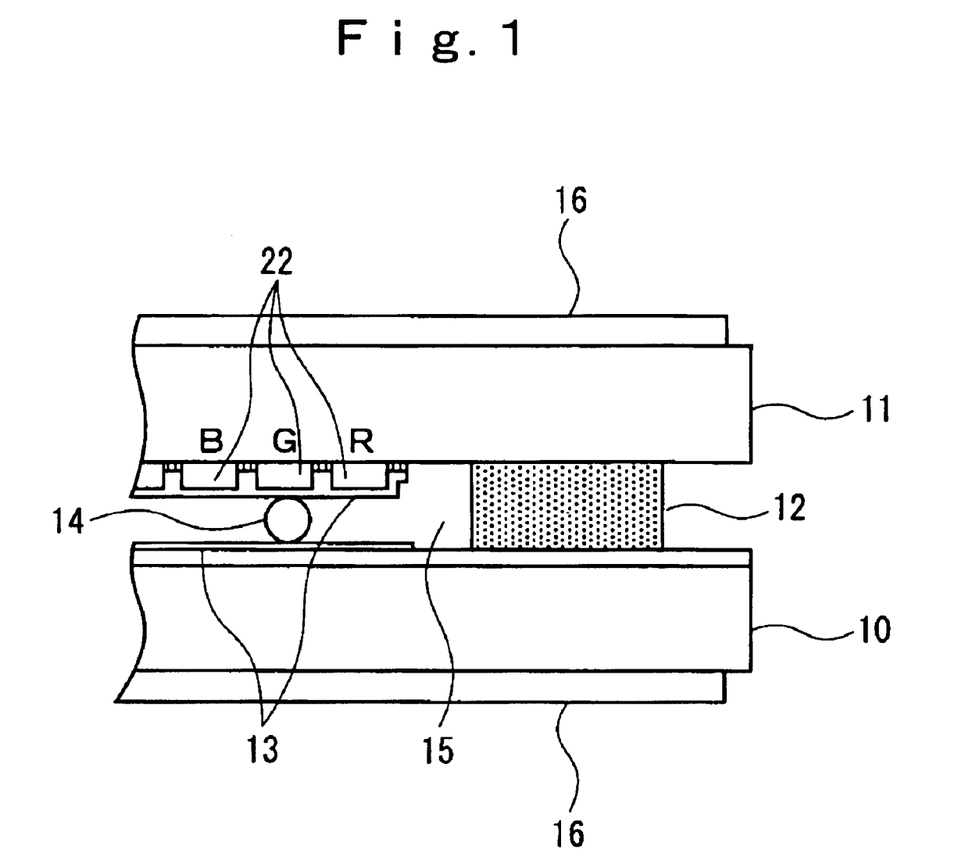
FIG. 1 is a cross-sectional view showing an embodiment of a liquid-crystal display element according to the present invention.
Figure 2:
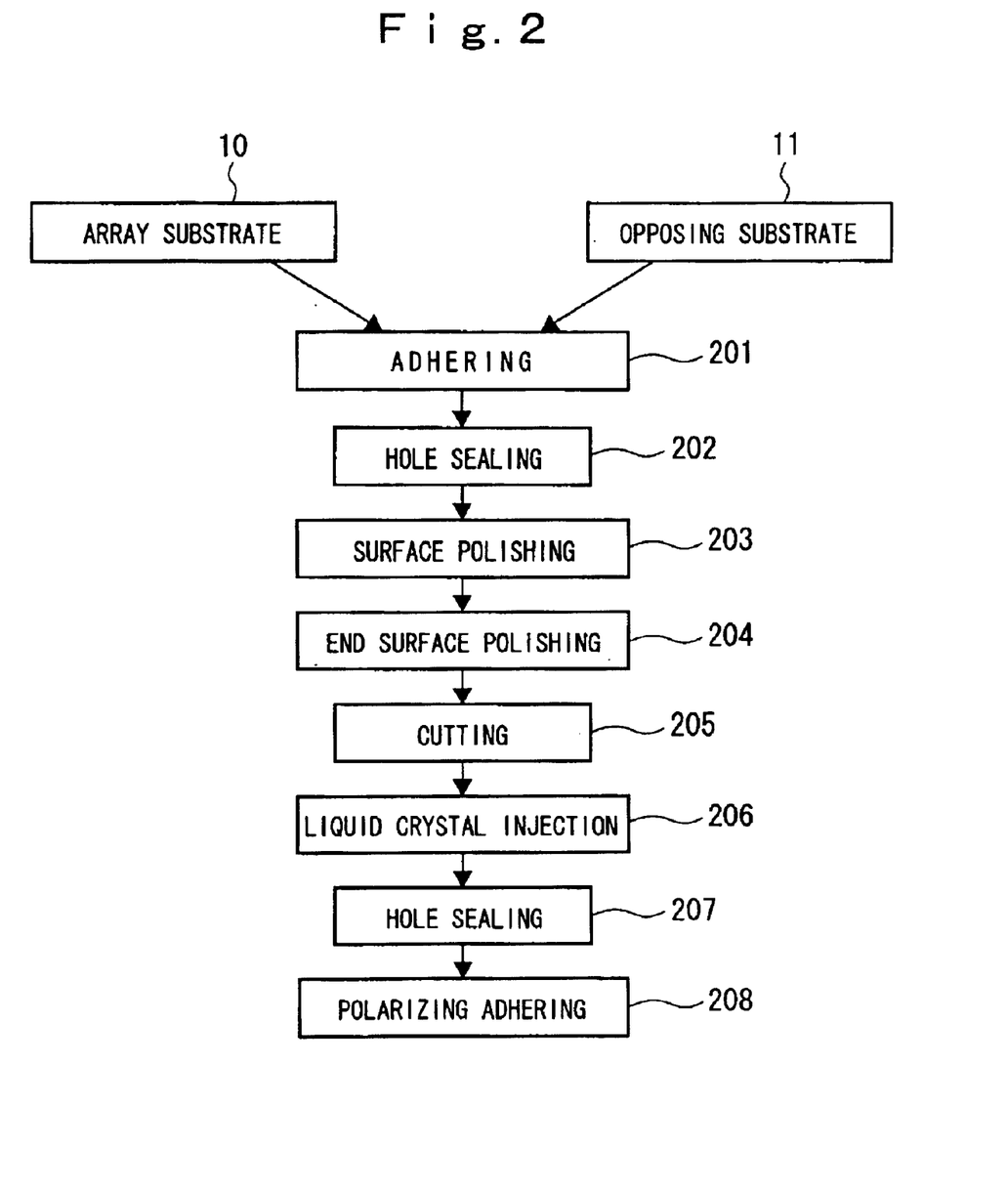
FIG. 2 is a process diagram showing the manufacturing process for the liquid-crystal display element of FIG. 1.
Figure 3:
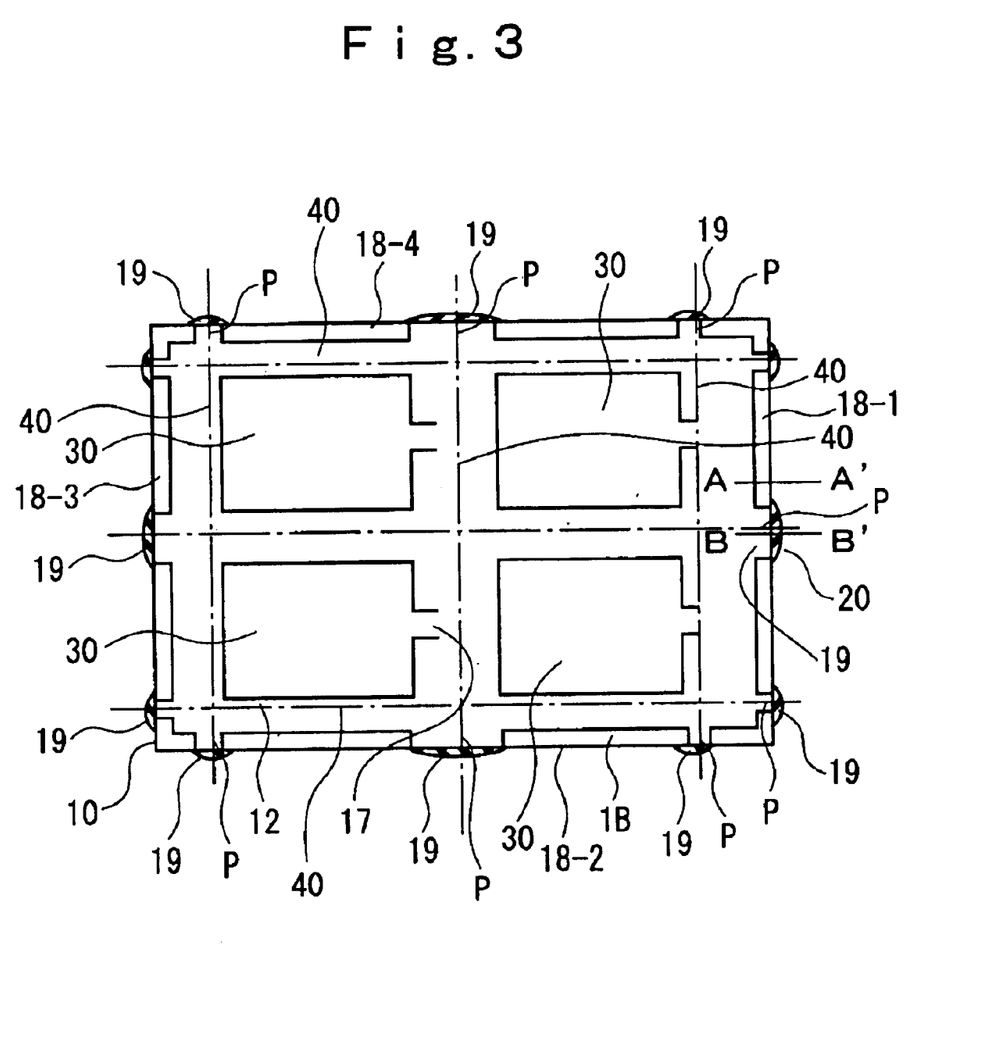
FIG. 3 is a plan view showing the pattern construction of FIG. 1.
Figure 4:
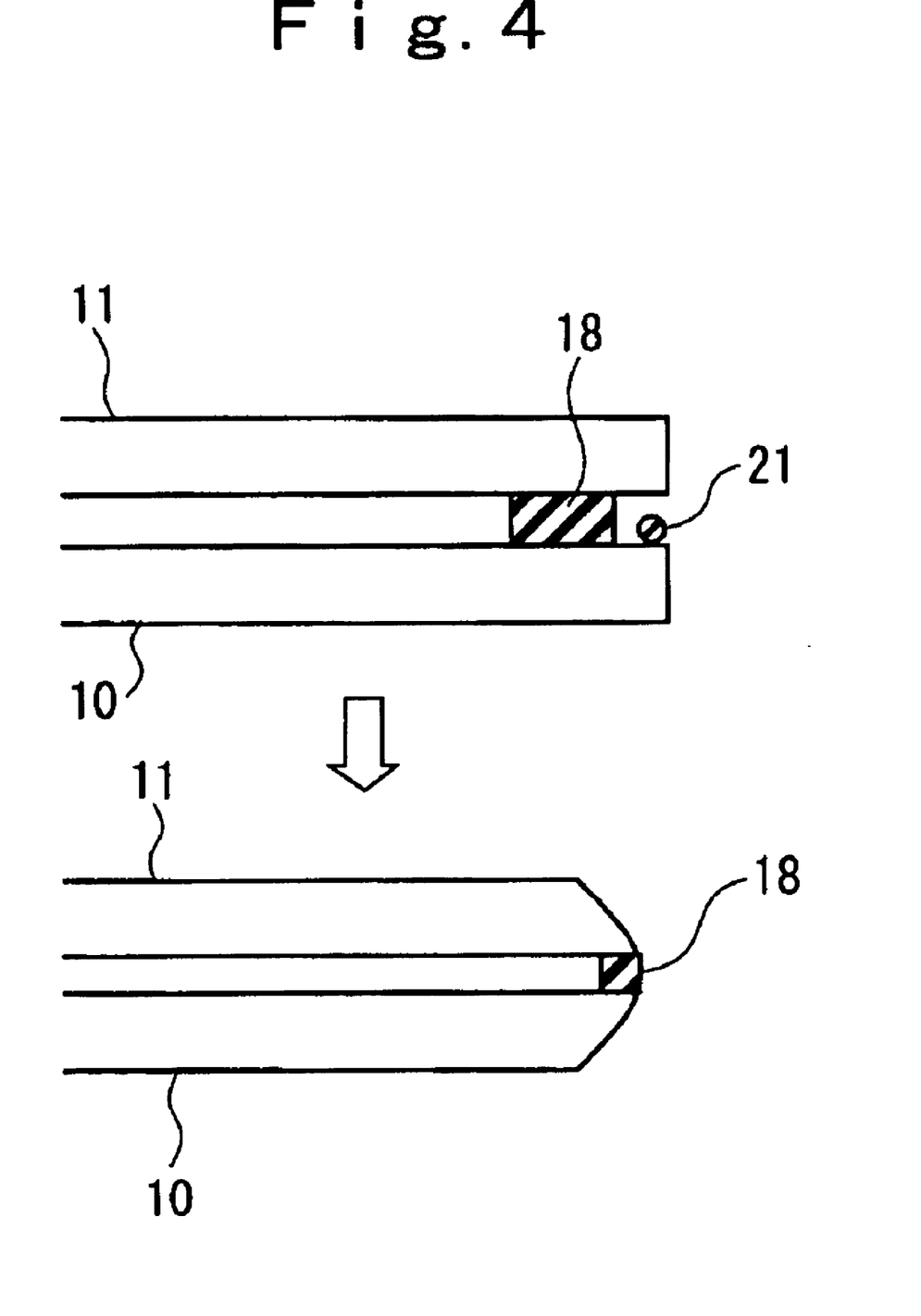
FIG. 4 is a cross-sectional view along the direction A–A' indicated in FIG. 3.
Figure 5:
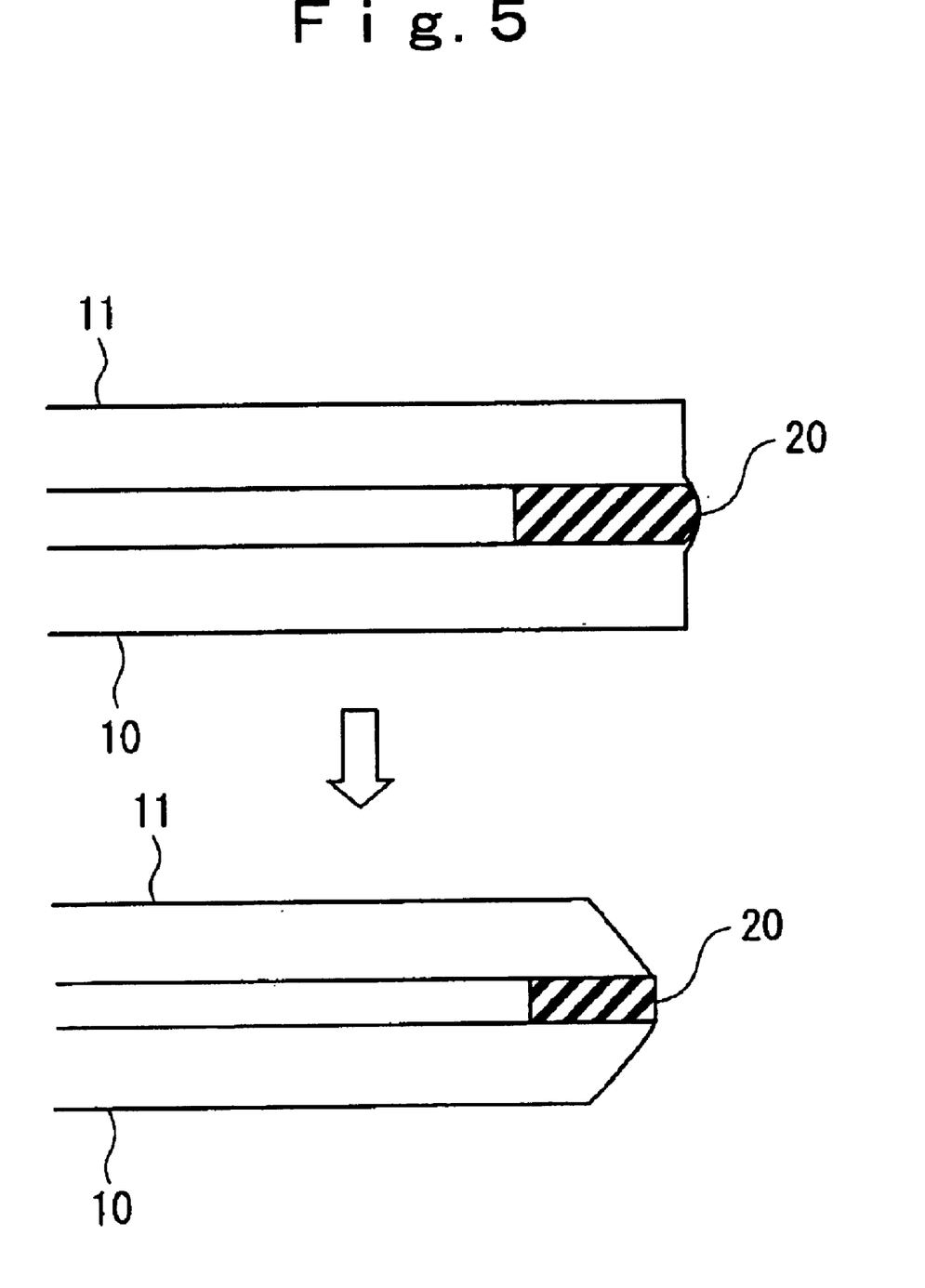
FIG. 5 is a cross-sectional view along the direction B–B' indicated in FIG. 3.

FIG. 1 is a cross-sectional view showing an embodiment of a liquid-crystal display element according to the present invention, FIG. 2 is a process diagram showing a method for manufacturing the liquid-crystal display element of FIG. 1, FIG. 3 is a plan view of the pattern structure of the seal of FIG. 1, FIG. 4 is an A–A' cross-sectional view of FIG. 3, and FIG. 5 is a B–B' cross-sectional view of FIG. 3.

The liquid-crystal display element shown in FIG. 1 is made up of an oriented array substrate 10 and an opposing array 11, which are adhered by an epoxy resin seal 12.

Spacers 14 (only one of which is shown) are disposed between the array substrate 10 and the opposing substrate 11 so as to maintain a uniform panel gap therebetween.

A liquid crystal 15 is sandwiched by the array substrate 10 and the opposing substrate 11. A polarizer 16 is adhered to the outer surface of the array substrate 10 and the opposing substrate 11.

In this case, a liquid crystal injection hole 17, to be described below, is provided in the seal 12.

After injecting the liquid crystal from the liquid crystal injection hole 17, the liquid crystal injection hole 17 is sealed by an acrylic resin, thereby holding the liquid crystal 15 therewithin. In these drawings, the reference numeral 13 denotes an orientation material, and 22 denotes color filters.

A liquid-crystal display element such as described above is manufactured as follows.

Specifically, as shown in FIG. 2, an array substrate 10 formed by performing a prescribed orientation operation and seal patterning and an opposing substrate 11 that is oriented and is treated so that a uniform panel gap is maintained are adhered together (step 201).

Next, after hole sealing so that polishing material is not introduced between the array substrate 10 and the opposing substrate 11, which are two glass substrates, the surface of at least one of the glass substrates is polished, and then the end surface is also polished, so as to make the thickness of the two glass substrates small (steps 202 to 204).

After the above, the individual liquid-crystal display elements are cut apart, the liquid crystal is injected into the element, the holes are sealed, and the polarizers are adhered, thereby completing the liquid-crystal display elements (steps 205 to 208).

The seal pattern structure is shown in FIG. 3 to FIG. 5.

A pattern for seals 12 which are provided liquid crystal injection holes 17, corresponding to each individual liquid-crystal display element, and a pattern for an outer peripheral seal 18 for preventing the intrusion of polishing material at the outer periphery are formed on the array substrate 10.

The seal material for the seal 12 and the outer peripheral seal 18 is an epoxy resin. The outer peripheral seal 18 is provided with a number of apertures 19 corresponding to the number of liquid-crystal display elements to be separated, on the virtual line along which they are to be cut apart.

The array substrate 10 and the opposing substrate 11, onto which is distributed the spacers 14, which maintain the panel gap uniformly, are adhered by heat treating at a temperature of 160° C., so as to harden the seal 12 and the outer peripheral seal 18.

When the above is done, because the apertures 19 of the outer peripheral seal 18 maintains the air pressures inside and outside the outer peripheral seal 18 at the same pressure, breakage of the seal pattern does not occur. Next, a hole sealant 20 made of a UV-curing acrylic resin is used to seal the apertures 19, this being subjected to UV radiation to harden the resin.

After the above, the surface of at least one of the two adhered glass substrates is polished. The polishing is done using an alumina-based polishing material with a grit diameter of approximately 10 μm and, after lapping the panel thickness down from 1.4 mm to approximately 1.05 mm, a cerium oxide based polishing material having a grain diameter of approximately 1 μm is used to perform polishing down to a panel thickness of approximately 1.0 mm.

The polishing force used is approximately 150 to 200 g/cm$^2$, and a water washing is done after polishing.

Next, in order to remove polishing material from the end parts of the two glass substrates, the end surfaces are polished. When this is done, as shown in FIG. 4 and FIG. 5, the end surfaces are processed so as to achieve a curved surface thereat, with the two glass substrates adhered together. After polishing the end surfaces, water washing is done.

In a liquid-crystal display element formed as described above, the pattern structure of the outer peripheral seal 18 is such that there is no intrusion of polishing material, and also so that apertures 19 are provided on extensions of the lines along which the individual liquid-crystal display element are cut apart.

Thus, by performing end surface polishing, there is total prevention of introduction of the polishing material 21 into the next process step, and also prevention of bad cutting at the cutting process step.

This is described below in further detail, with reference made to FIG. 4 and FIG. 5.

FIG. 4 shows the condition in which the remaining polishing material 21 is removed by end polishing. By removing the remaining polishing material, it is not introduced into the next process step, so that it does not contaminate the manufacturing apparatus in subsequent steps.

Also prevented are problems such as polishing material 21 being intruding between the glass substrates (FIG. 1) so as to cause poor orientation or prevent proper application of voltage across the liquid crystal 15.

When the cutting apart is done, the hole sealant 20 on the line along the cutting line B–B' of FIG. 3 is traversed in making the cut. Because the hole sealant 20, in contrast to the epoxy resin used in the outer peripheral seal 18, is a soft acrylic resin, there is no particular stress applied to the glass substrates when the cutting is done, so that undesirable scribing and breaking are prevented.

In this embodiment of the present invention, therefore, each liquid-crystal injection area is surrounded by a seal 12, and the overall liquid-crystal injection area is surrounded by an array substrate 10 and an opposing substrate 11 surrounded by an outer peripheral seal 18 having apertures 19. The apertures 19 of the outer peripheral seal 18 are sealed by a hole sealant 20, and the surface of at least on of the array substrate 10 and the opposing substrate 11 are polished with a polishing material 21, which is then removed, after which cutting along the apertures is done to separate the individual liquid-crystal injection areas. Using this method one eliminates residual polishing material 21 caused by bad cutting, thereby facilitating the achievement of a thin liquid-crystal display element and improving the yield and the quality thereof.

Although the above-noted embodiment of the present invention was described for the example in which the thicknesses of the array substrate 10 and opposing substrate 11, which are glass substrates, is made thin by polishing, it will be readily understood that the present invention is not restricted in this manner, and can be applied as well to a case in which, for example, the thickness of the array substrate 10 and the opposing substrate 11 is made thin by etching.

Additionally, it will be understood that the liquid-crystal display element of the present invention is not restricted to an active matrix array such as a TFT or MIM type, but can also be applied to a liquid-crystal display using a drive method such as that of a simple matrix display or a segment display as well.

A separate embodiment of the present invention from those as mentioned above, will be explained hereunder with reference to FIGS. 3 to 5.

In this embodiment, a liquid-crystal display element array is provided and as shown in FIG. 3, the liquid-crystal display element array of this embodiment comprises an array substrate 10 and an opposing substrate 11 and a plurality of liquid-crystal injection areas 30, each being surrounded by a seal 12 having an aperture 17 and the an overall liquid-crystal injection areas 30 being further surrounded by an outer peripheral seal 18 having apertures 19 sealed with a hole sealant 20, both of which being formed between the array substrate 10 and the opposing substrate 11, wherein at least a surface of either one of the array substrate and the opposing substrate is polished and at least an end portion of either one of the array substrate and the opposing substrate is polished, and further wherein a plurality of the apertures 19 are provided along each one of the outer peripheral seals 18-1 to 18-4 and at crossing points P each being formed between the outer peripheral seal 18 and a virtual line 40 along which the individual liquid-crystal injection areas 30 would thereafter be cut apart.

In this embodiment, the end portion of either one of the array substrate and the opposing substrate has a tapered configuration.

According to the liquid-crystal display element and method for manufacturing a liquid-crystal display element according to the present invention as described in detail above, by adopting a constitution in which each liquid-crystal injection area is surrounded by a seal, and the overall liquid-crystal injection area is surrounded by an array substrate and an opposing substrate surrounded by an outer peripheral seal having an aperture and are adhered together, the aperture of the outer peripheral seal being sealed by a hole sealant, and the surface of at least one of the array substrate and the opposing substrate being polished with a polishing material, which is then removed, after which cutting along the aperture is done to separate the individual liquid-crystal injection areas, the achievement of a thin liquid-crystal display element is facilitated, and it is possible to improve both liquid-crystal play element quality and yield.

What is claimed is:

1. A liquid-crystal display element array which comprises an array substrate and an opposing substrate and a plurality of liquid-crystal injection areas, each being surrounded by a seal having an aperture and said plurality of liquid-crystal injection areas being further surrounded by an outer peripheral seal having at least one pair of oppositely disposed apertures each sealed with a hole sealant, both of which being formed between said array substrate and said opposing substrate, wherein at least a surface of either one of said array substrate and said opposing substrate being polished and at least a peripheral portion of either one of said array substrate and said opposing substrate being tapered so that the peripheral portion of said array substrate is smaller than a non-peripheral portion, and, said peripheral portion being polished, and further wherein said at least one pair of oppositely disposed apertures of said outer peripheral seal are being provided along ones of said outer peripheral seals and at crossing points formed between said outer peripheral seal and a virtual line along which said individual liquid-crystal injection areas would thereafter be cut apart.

2. A liquid-crystal display element array according to claim 1, wherein an end portion of at least one of an array substrate and an opposing substrate has a tapered configuration.

3. A liquid-crystal display device formed by an array substrate and an opposing substrate comprising:
   1) a plurality of liquid-crystal display areas;
   2) a seal surrounding each of said plurality of liquid-crystal display areas and at least one aperture through said seal to define an injection port for said each of said plurality of liquid-crystal display areas;
   3) an outer peripheral seal formed by a first material and having at least one pair of oppositely disposed apertures;
   4) an aperture sealant formed by a second material, softer than said first material, and positioned within said at least one pair of oppositely disposed apertures for sealing same;
   5) a surface of at least one of said array substrate and opposing substrate being polished; and
   6) a peripheral portion of at least one of said array substrate and opposing substrate being polished and tapered so as to be smaller than a non-peripheral portion.

4. The liquid crystal display device as recited in claim 3 wherein said first material comprises an epoxy resin, and said second material comprises a UV-curing acrylic.

* * * * *